(12) United States Patent
Dodge

(10) Patent No.: X3668
(45) Date of Patent: Mar. 6, 1823

(54) PRINTING , ART OF

(76) Inventor: William M. Dodge

William M Dodge
Letters Patent

The schedule referred to in these Letters Patent and making part of the same containing a description in the words of the said William M Dodge himself of his improvements in the art of printing —

This improvement consists in the construction and use of Presses and apparatus for printing These presses are in some respects similar to those in common use; but the mode of producing the pressure is by means of rollers acting in sockets or on inclined planes as substituted for the screw. The rollers are cylindric elliptic or conical according as the construction of the ~~construction~~ of the press requires but the sections may be either middle sections of either of the above figures retaining the curve of the two opposite sides of said figures or have the two opposite points against which the pressure is exerted either cylindric conic or globular and fitted into sockets or cavities of a corresponding shape; and while one of these cavities is stationary the other or others of them must be mova-ble so that when a lateral motion is given it changes the perpendic-ular distance between the two cavities that is, when applied to the prin-ting press, it allows the moveable cavity to rise or fall by the motion of the bar. Thus suppose a cylindric cavity to be made on the top of the platten and another to be made directly over it in the under side of the head of the press and two of the above named sections fitted into these cavities while the opposite sides of the sections come in con-tact. when the platten is pressed sufficiently hard upon the type or form the sections are drawn nearly to a perpendicular direction and their sides which come in contact are [illegible] to each other by means of a cylindric cavity in the lower one and a semicircular projection on the upper one. To this part the bar is connected by a link so that when it is pulled forward the platten is forced down upon the type the bar being secured to a perpendicular spindle which vibrates on hinges secured to one of the Checks or sides of the press and the link being connected to the bar by a joint as near the centre of motion as the dis-tance which the sections require to move will admit.

The sections of a cone produce the same effect as those of a cylinder when the proportions are similar but are somewhat more difficult of application. Thus suppose the common bar and spindle to be used without the threads of the screw. take two bars of iron from eight to twenty four inches long and weld a globular piece of steel on each end of these bars which is in what may be term the sections. make globular cavities in the opposite sides of the bar and the similar ones in the head of the press so that these bars will fit into both cavities at once and extend from the head of the press to the bar, by then moving the bar to and fro in the usual way, the platten will rise and fall. The sections should be so situated that when the bar is pulled inward and the pressure produced they should stand on opposite sides of the spindle at equal distances from it and nearly perpendicular. The upper cavities may in all instances be made in the top of the sections instead of the head of the press. The weight of the platten sections &c. may be suspended with springs or other things When complete cylinders, cones, or oval rollers are used or sections of them, retaining the curves of either of these figures, the inclined plane or wedge is introduced above and below the rollers or between them so as to graduate the pressure to any required force: though the simplest form is to weld the steel on the rollers in such a manner as to form inclined planes on their surfaces which come in contact or one of these planes may be formed on the platten, or on the head of the press. Likewise separate wedges may be introduced above or below the rollers for the purpose of increasing or diminishing the pressure at pleasure.

The bar or lever may be used to move the rollers, as before de-scribed, or any other mode of attaching the moving parts of the rollers to any point in the bar which will give them the necessary motion.

will answer the purpose. But the most effectual mode of avoiding friction is to let a perpendicular pin extend up or down from the common bar (the proper point to give the required motion) make a square hole in the link which connects the bar with the rollers which hole should be so large as to prevent the pin from coming in contact with any part of it except the side against which the pressure is exerted. By this means the pin rolls upon the surface against which the pressure is exerted instead of slipping in the usual way. The link may be connected with pins extending from each end of the rollers in the same way so as to avoid the friction at both ends in all cases where there is considerable pressure and motion the parts which come in contact should be made of the best of steel and hardened and made upon sections of circles and planes in the way described.

Another application in which the rollers may be used to produce the impression is to adapt the types to a cylinder by using spaces between the lines in the form of a wedge. These spaces should be so cast as to fit into the nicks in the type to prevent them from falling out of their places as the roller revolves. The spaces may likewise extend into the furniture of the form or into the chase to hold the type the more secure, or the type may be cast in form of a wedge so as to be set around the roller without resorting to spaces to form the circle. Small wires may be introduced into the nicks of the types and extend into the circular chase and furniture to secure them instead of spaces. The types being set round two similar rollers of suitable size to contain one or more forms each the other rollers are made to revolve in contact with the face of the type. Blankets and tympan sheets of the usual kind are wound on these last mentioned two rollers which with those containing the type are so arranged that the paper to be printed passes between them. Thus let a sheet of paper be straightened horizontally; at one end place one of the type rollers under it and at the other end place the other type roller over the sheet, under the latter and over the former are placed the separate rollers on which are wound the blankets &c. these are all so connected together by cog wheels that they revolve in exact concert: so that the register is made more perfect than it can be in the usual way. One of the cog wheels is connected with its type roller by screws so that its position can be changed at pleasure in making register. A continued sheet may be passed between these rollers, and printed with great dispatch on both sides by first winding it up on a roller, while wetting it and then pass -ing it between those above described, and after leaving them it may be either wound up on another roller or passed off to dry in the same manner as it is dried in the paper staining business Each of the type rollers is supplied with ink by three or more rollers having woollen cloths wound round them and covered with the same leather or skins with which the common printers balls are covered; these revolve in contact with the face of the letter and are supplied by another roller which passes to and fro round the outside of the whole touching each as it moves. this may be sup -plied by other distributing rollers (revolving on their axes by the motion of either of either of those first mentioned) to which the ink is applied by a common brayer or by a cylindric brush revolving in a vessel containing ink. The ink may be equalized on the distri -buting rollers by a small roller moved by machinery or by hand backwards and forwards across them or it may be equalized in this manner on a board, and then applied to the rollers.

The other apparatus belonging to the subscribers improve -ment in the art of printing is described as follows: The bed and platten of the press are to be each of the size of the forms to be printed. The bed is placed horizontally obliquely or perpendicularly and the platten is hinged to it in the same manner and to answer the same purpose as the common tympan; and when it is brought down on the form the impression is produced by an application of the press -ure before described upon the end of the platten opposite to the hinges The platten is then raised and the sheet removed in the usual way or there may be the friskets of the common kind hung in the ordinary tympan, without [illegible] by a hinge or [illegible] extending from the middle of one of the friskets, which are hinged together at one end and pasted or covered in the usual way. The sheet being between the friskets can be placed on the form first one side down and then the other by turning them upon the ends. The friskets are held together by a slight catch and the sheet held in its place by pins and corresponding holes in the friskets. In this case the blankets and tympan sheet are attached to the platten whether it swings as before mentioned or is suspended in the usual way. And in case of printing both sides of the paper as above before it is removed from the friskets, the tympan sheets should be longer than usual and revolve or move laterally upon the face of the platten so as to prevent the ink which adheres to it from soiling the paper while printing and a cylinder brush or roller may be used to remove or absorb the ink as the tympan sheet passes to and fro in contact with it. For the purpose of changing the tympan sheet as above one method is to have two rollers one at each end of the platten on which the tympan sheet (which may be of thin cotton linen or other cloth or paper) may be alternately wound by the movement of the press.

The ink may be applied by rollers as follows. Prepare two or more rollers as before described and range them in a frame, to which connect ~~them~~ with a rod of suitable length and size to move the rollers forward and back across the form. The rod may be moved by a spur cog wheel fixed on a shaft in the rear of the press, which will mesh into a rack or cogs on the rod. This wheel may be put in motion by a bevel cog wheel on the same axle which may be worked by another bevel wheel connected to the back hinge of the platten. These may all be sections of wheels of suitable size to produce the required motion, or any other plan may be adopted to produce a lateral motion in the rollers by the motion of the press. Two distributing rollers placed at the back of the form may may be turned by a bevel cog wheel on one of their axes, working with a larger wheel also on the back hinge of the platten; these rollers being in contact will both turn together and insure an equal distribution of ink. The ink may be supplied to these rollers as before described by a cylindrical brush or otherwise. The ink may be equalized on all parts of the rollers which pass over the form by their rolling over a horizontal board which is turned slowly on a vertical axle by the motion of the press.

The various other uses to which the Subscriber has contemplated applying the foregoing principles are as follows: The mode of producing pressure before described is applicable to all descriptions of presses. Where it is necessary to continue the pressure a considerable distance the dimensions of the rollers or sectors inclined planes &c. should be increased accordingly. But where a mere impulse is required such as for coining die-sinking &c the dimensions of the component parts must be proportioned to the distance which the die or part which produces the effect is required to move. These variations and likewise the particular applications which among the foregoing is best adapted to the required operation will readily suggest themselves to the skilful artist who constructs the machine. In the preceding specification there may be found descriptions of parts of machinery common to the public or belonging to others which are introduced merely to illustrate the principles originating with and applied by the Subscriber to the purposes stated and for which alone he claims an exclusive right William C. McDodge Witnesses
Jno Slagrove
Henry W. Rose Exd.
M.G.C.

2—328 a.

DRAFTSMAN'S DIVISION.

*All communications should be addressed to*
"The Commissioner of Patents,
Washington, D. C."

*DEPARTMENT OF THE INTERIOR,*

United States Patent Office,

*Washington, D. C.,* ..................., *189*...

*SIR:*

*The printed* ......copies...... *of Patent No.* W. M. Dodge
Mar 6, 1823
......are...... *exhausted.*

*As soon as printed a copy will be mailed you to complete your order.*

..................................................................

..................................................................

*By direction of the Commissioner:*

*Very respectfully,*

..................................................
*Chief Clerk.*

..................................................

..................................................

..................................................

814316-97-5m